(12) United States Patent
Kelly

(10) Patent No.: US 11,880,412 B2
(45) Date of Patent: *Jan. 23, 2024

(54) BUSINESS SOFTWARE PLATFORM AND KIOSK

(71) Applicant: Elumus, LLC, Bozeman, MT (US)

(72) Inventor: Matthew M. Kelly, Brooklyn, NY (US)

(73) Assignee: Elumus, LLC, Bozeman, MT (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/494,374

(22) Filed: Oct. 5, 2021

(65) Prior Publication Data

US 2022/0027411 A1 Jan. 27, 2022

Related U.S. Application Data

(63) Continuation of application No. 15/979,443, filed on May 14, 2018, now Pat. No. 11,138,270.

(60) Provisional application No. 62/505,466, filed on May 12, 2017.

(51) Int. Cl.
| | |
|---|---|
| *G06F 7/00* | (2006.01) |
| *G06F 16/9038* | (2019.01) |
| *G06F 9/451* | (2018.01) |
| *G06F 16/21* | (2019.01) |
| *G06F 16/907* | (2019.01) |
| *G06F 16/9032* | (2019.01) |
| *G06F 16/903* | (2019.01) |
| *G06F 9/455* | (2018.01) |
| *G06F 8/38* | (2018.01) |

(52) U.S. Cl.
CPC ............ *G06F 16/9038* (2019.01); *G06F 8/38* (2013.01); *G06F 9/451* (2018.02); *G06F 9/45529* (2013.01); *G06F 16/211* (2019.01); *G06F 16/907* (2019.01); *G06F 16/90332* (2019.01); *G06F 16/90335* (2019.01)

(58) Field of Classification Search
CPC ............ G06F 16/211; G06F 16/90332; G06F 16/90335; G06F 16/907; G06F 16/9038; G06F 8/38; G06F 9/451; G06F 9/45529
See application file for complete search history.

(56) References Cited

U.S. PATENT DOCUMENTS

| | | | | |
|---|---|---|---|---|
| 6,119,104 A | * | 9/2000 | Brumbelow | G06Q 20/18 186/37 |
| 6,182,274 B1 | * | 1/2001 | Lau | G06F 8/36 717/104 |

(Continued)

*Primary Examiner* — Mohammed R Uddin
(74) *Attorney, Agent, or Firm* — K&L Gates LLP

(57) ABSTRACT

A system includes a controller, a database controlled by the controller, and a memory including an end-user executable code and a business software management code. The controller receives a user update to modify the end-user executable code, converts the user update to a machine language input, and, in response to the machine language input, modifies one or more of the end-user executable code, the database structure, and a documentation of the end-user executable code. In response to executing the program instructions associated with the modified end-user executable code on the end-user device, the controller generates a data collection GUI according to the modified end-user executable code and stores data in the database structure according to the modified end-user executable code.

20 Claims, 15 Drawing Sheets

(56) References Cited

U.S. PATENT DOCUMENTS

| | | | | |
|---|---|---|---|---|
| 6,268,852 B1* | 7/2001 | Lindhorst | G06F 8/34 | 717/113 |
| 7,055,014 B1* | 5/2006 | Pawlowski | G06F 3/067 | 711/111 |
| 7,505,990 B2* | 3/2009 | Krishna | G06F 16/93 | 707/999.102 |
| 7,677,896 B1* | 3/2010 | Sonwalkar | G09B 7/00 | 434/236 |
| 8,554,802 B1* | 10/2013 | Barden | G16H 10/20 | 709/224 |
| 8,690,062 B1* | 4/2014 | Qureshi | G06Q 10/1093 | 235/462.11 |
| 9,009,585 B1* | 4/2015 | Chetrit | G06F 9/453 | 715/221 |
| 9,104,867 B1* | 8/2015 | Thioux | H04L 63/1416 | |
| 9,223,549 B1* | 12/2015 | Hermanns | G06F 8/315 | |
| 9,959,098 B1* | 5/2018 | Smith Devine | G06F 40/18 | |
| 2002/0091539 A1* | 7/2002 | Yin | G06Q 10/10 | 705/7.38 |
| 2002/0107744 A1* | 8/2002 | Rosenberg | G07C 9/23 | 705/18 |
| 2003/0043187 A1* | 3/2003 | Li | G06F 9/453 | 715/749 |
| 2003/0216831 A1* | 11/2003 | Hart | G16H 15/00 | 700/235 |
| 2005/0086240 A1* | 4/2005 | Richardson | H04N 1/32101 | |
| 2006/0026122 A1* | 2/2006 | Hurwood | G06F 16/838 | 715/255 |
| 2006/0069628 A1* | 3/2006 | Le | G06Q 10/087 | 705/28 |
| 2006/0178778 A1* | 8/2006 | Fuhlbrigge | G05B 19/0426 | 700/264 |
| 2007/0136150 A1* | 6/2007 | Biancavilla | G06Q 10/08 | 705/28 |
| 2007/0180353 A1* | 8/2007 | Hundhausen | G06F 40/174 | 715/205 |
| 2009/0089216 A1* | 4/2009 | Srivastava | G06Q 30/0601 | 705/26.1 |
| 2009/0217302 A1* | 8/2009 | Grechanik | G06F 11/3684 | 719/320 |
| 2010/0332271 A1* | 12/2010 | De Spong | G06Q 10/06 | 715/764 |
| 2011/0320479 A1* | 12/2011 | Burris | G06F 16/245 | 707/769 |
| 2012/0054593 A1* | 3/2012 | Naderi | G06F 40/174 | 715/224 |
| 2012/0315881 A1* | 12/2012 | Woloshyn | G06Q 10/10 | 455/412.2 |
| 2013/0275187 A1* | 10/2013 | Patel | G06Q 10/06398 | 705/7.42 |
| 2013/0304547 A1* | 11/2013 | Adler | G06Q 10/06393 | 705/7.39 |
| 2014/0033327 A1* | 1/2014 | Conte | G06F 21/60 | 726/28 |
| 2014/0081892 A1* | 3/2014 | Sellers-Blais | G06N 7/00 | 706/11 |
| 2014/0229815 A1* | 8/2014 | Clifford | G06F 16/2433 | 715/224 |
| 2015/0020170 A1* | 1/2015 | Talley | H04L 63/08 | 726/4 |
| 2015/0066919 A1* | 3/2015 | Park | G06F 16/434 | 707/724 |
| 2016/0321757 A1* | 11/2016 | Hegarty | G06Q 40/08 | |
| 2016/0328092 A1* | 11/2016 | Bakos | G06F 8/38 | |
| 2019/0190966 A1* | 6/2019 | Décoret | H04L 65/70 | |

* cited by examiner

BUSINESS SOFTWARE PLATFORM AND KIOSK

CROSS-REFERENCE TO RELATED APPLICATIONS

This application comprises a continuation of U.S. application Ser. No. 15/979,443 filed May 14, 2018, which claims the benefit of priority to U.S. Provisional Application 62/505,466 filed on May 12, 2017, the entireties of which are incorporated herein by reference.

BACKGROUND OF THE INVENTION

The present subject matter relates generally to an improved business software platform for general-purpose data tracking, process control, and reporting. More specifically, the present invention relates to a cloud-based business software systems and methods that allow for easily defining and recording custom data sets, easily defining and enforcing processes and controls, simple and rapid report writing, and categorically improved usability, customizability, extensibility, integration, and upgradeability.

Traditional business software is plagued by the inability of users to fully utilize what is before them, due to complex, confusing, and slow user interfaces. Moreover, traditional business software programs have platform dependence, or an overall incompatibility with other pieces of software, or even different generations of their own software.

Moreover, in today's technological age, many business software platforms have no mobile versions, or, if they do, are hampered by reduced mobile functionality which differentiates and fragments what can be done on the main platform, and what can be done on mobile. Another significant problem with current business software is the prevalence missing or outdated documentation, further exacerbating usability and process control deficiencies.

Another problem arises in the miscommunications between process managers and developers; often developers want to introduce certain functionality into a software platform that meets a need not at all shared by a project manager, and vice versa. Keeping these two spheres separated in the business world only hampers productivity and leads to greater incompatibility between corporations and technologists. Existing business platforms, if customizable at all, tend to have customizations that are expensive and difficult to manage, and existing business software platforms can also have difficulty reporting for audit purposes (code changes, security setups, etc.) or simply difficulty in reporting, generally.

Many current business platforms also suffer from a lack of transparency into business logic, making auditing of the system by non-technical users difficult, if not impossible. Issues surrounding miscommunications between business managers and technical personnel thereby extend into the realm of system audits, in addition to those mentioned above.

Difficult to implement and maintain (both regarding infrastructure and code) software is frustrating and disadvantageous for businesses who may be dissuaded from upgrading their existing platform or joining a new platform because of the complexities in transitioning from one business software to another. A prominent and severely limiting problem with existing business software platforms is their cost; as programs become more expensive, businesses are faced with a choice between functionality the could use, and functionality they can afford. Often, less expensive software presents further problems for a business in terms of stakeholder and user dissatisfaction.

Accordingly, there is a need for an improved business software platform for general-purpose data tracking, process control, and reporting, as described herein.

BRIEF SUMMARY OF THE INVENTION

To meet the needs described above and others, the present disclosure details an improved business software system for data tracking, process control, and reporting. The business software system of the present application enables a business or client to generate data collection graphical user interfaces (GUI) for use by its employees to enter data in response to information prompts related to the business's goods and services. In one embodiment, the business software system provides an initial setup GUIs to enable a business user to identify an information prompt, associates the information prompt with metadata tags, and generates data collection GUI(s) based on the metadata tags for use by business employees for managing the business. Specifically, the business software system includes a database in which the information prompts, the metadata tags, and the data including the responses to the information prompts are stored along with code for generating the data collection GUIs using the information prompts and related metadata.

In the initial setup GUI, the business user identifies at least one information prompt to be used in the data collection GUI to collect data including a user response to the information prompt. In one example, the business software system may be used for logging and tracking information related to warehouse shipments. The business user may submit information prompts to solicit the customer name and contact information, a shipment label, the manner in which the shipment is received (by flat rack, truck, or container), whether the shipment seal is intact, the bar code information, etc. The business software system identifies metadata tags to be associated with the information prompts that include the GUI structure to be used when presenting the information prompt to a user through the data collection GUI. For example, the customer name information prompt to be entered in a data collection GUI will be tagged with a blank field, while the information prompt to determine the manner in which the shipment is received will be selected from a drop down menu.

In response to a user request to generate the data collection GUI, the business software system then generates data collection GUIs using the code in combination with the metadata and the information prompt. The data collection GUI presents the information prompt to the user and stores the data collected through the data collection GUI, including a user response to the information prompt, in a database. For example, in a data collection GUI, the business employee may enter that a shipment is damaged. A subsequent data collection GUI includes an information prompt for entering an incident report and upload photos of the damaged shipment. The database may also include code to automatically generate a formal incident report that is sent directly to a site manager or other business employee(s).

The business software system may include features that allow for customization of the metadata tags associated with the data collected through the information prompts as well as customization of the standard user interfaces and coding within the database.

One aspect of the present invention provides a database that allows users to easily construct, modify, and maintain their own data schemas. The database includes abstractions which are similar to those created by object relation mapping (ORM) of the underlying SQL tables which are referred to as "lists". The building block of lists, just like with database tables, are columns (sometimes referred to as "fields" in the realm of databases but referred to as "columns" in the present disclosure).

An advantage of the columns is that, though they have much in common with standard SQL fields, there is one key difference that sets them apart: the available data types on the columns (referred to as "column types") are modular, meaning they can be added or removed at will. Additionally, they can be custom-programmed to accommodate many kinds of data. The column types can therefore range from the primitive (e.g., integers) to the complex (e.g., signatures or bar codes). They can also be custom-built by users who wish to extend the functionality of the system for their own unique business requirements.

An additional advantage of the columns types is that they are more than mere data types. They also provide specifications for how to render the data for user and system interfaces—both read-only and read/write implementations. Because the column types define the user interface, they provide any custom functionality required for data entry into columns of that type. This is handled, in some embodiments, by the use of JavaScript, defined on the column type, in the execution module. This information is then dynamically loaded into a data entry module of the client facing JavaScript that handles a procedure's execution (where all data entry must take place). In this way, a custom-built column type can have as complex of a data entry process as required, without requiring any customizations to the core code of the software platform itself.

For example, the column type for signatures requires a jQuery (a type of JavaScript) plug-in to capture a user's signature on a touch screen-enabled device (or by using a mouse) on an HTML canvas element. The signature(s) must then be transformed with the point/vector data and turned into a (SVG) construct to pass back to the server. All of this code is bundled in the signature column type's JavaScript property and placed into the presentation layer during execution. This means there is no custom logic in the core code of the system that handles signature data; it is wholly contained within the modular signature column type.

Yet another advantage of this aspect of the invention is that all column data is persistent in the database(s). As mentioned, column types can be as simple or as complex as necessary. In some situations, multiple fields in the underlying data table might be required to house the data for a single column of a given column type. To account for this, each column type specifies how it is to read and write data from and to the database. Additionally, columns combined with column types are self-documenting. Any column added to a list includes documentation of what kind of data belongs in the column, and any constraints on that data.

An additional advantage is the convenience and integration of two forms. Taken together, a column and its column type are not mere data schema specifications; they are definitions for managing a set of data for everything from interactivity on a user interface, to persistence in a database, to describing themselves to the user.

Another aspect of the present invention is the business assembly language. Business assembly language (BA) is a natural language-based domain-specific language (DSL) that bridges the gap between what process owners want, and what developers develop. In the language of the domain-driven design (DDD) software development paradigm, BA is a ubiquitous language for the process design.

BA is the only programming language to feature the following characteristics: unlike other existing software languages, such as, COBOL, AppleScript, and others, it actually reads like natural language; it's written using an HTML editor, not a text editor; it uses unique and extensible lexical parsing logic to separate functions and parameters from syntactic sugar, and to validate those functions and parameters; it uses XML tags to distinguish commands and parameters from syntactic sugar at the user interface level, allowing developers to easily reason about what the executor (interpreter) will do (i.e., it avoids the pitfall of being a "write/read never" language); and the BA language is designed not for the developer's ease, but for the auditor's ease, such that the "code" is easily decipherable by non-developers who wish to validate that the programmed code is handling data access, data changes, process validations, etc. according to required business controls.

In addition to being readily understandable by stakeholders, project managers, process owners, users, and developers alike, BA is also executable code. There is no opportunity for anything to get mistaken in the implementation of the technical specification into code as the specification can literally be the code. This is achieved by providing high-level commands that perform standard, discrete business operations (e.g., sending an email, entering new data, running a report, etc.) that can be mixed with natural language to make the code readable by non-developers.

There are several aspects to the system that make this possible, including command definitions, parameter definitions, parameter types, text parsing logic, command and parameter compiling logic, text tagging, and command execution logic. One such aspect of the invention are the command definitions. Command definitions provide the basis for interpreting the text of a step of a programmed process. The definition describes aliases—the word or words indicating that the command is to be called; parser helpers; various settings that assist the parser in determining whether the words found in the text are meant to call the command or are just syntactic sugar; and parameter definitions—what parameters, if any, are required by the command for it to execute. Parameter definitions provide the bulk of the information relied upon by the parser to find the arguments required by the command within the text of the step. This information includes the order of the parameter relative to other parameters on the command and the parameter's optionality and optionality condition (i.e., it may be optional, required or ignored depending upon whether other parameters are provided or not).

A further advantage of this aspect of the invention is that it allows for a wide range of parameter types. Parameter types provide the actual parsing logic for the argument in the text. Some examples of parameter types include Boolean expression (e.g., for data filters or conditional statements), email recipient (email addresses, contact names, departments, or distribution list names) and report names (the name of a report in the system).

Another advantage is the operation of the text parsing logic. As mentioned above, the bulk of the text parsing logic is defined within each parameter type. The parameter type looks for certain key words in the text relative to the command and other parameters to determine if the argument is given.

In one example, the parsing logic looks for any "at" (@) symbols in the text following the starting point and checks to see if it's part of a valid email address. If so, it returns it as a successfully parsed parameter. The parsing module itself handles looking for commands in the text. For each possible command found, it then calls the parsing operation of each parameter type for each parameter definition on the command.

An example of an email parameter type's parsing logic is as follows (some code removed for clarity):

```
protected override async Task<InternalParseResult> TryParseAsync(
    string text,
    int startAt,
    IParamDefinition paramDef,
    ParserResult resultsThusFar)
{
    InternalParseResult ret = null;
    var ats = text.IndexesOf(startAt, "@");
    foreach (var at in ats)
    {
        int begin = text.Substring(startAt, at - startAt).LastIndexOf(' ');
        begin = begin < 0 ? 0 : begin + 1;
        int end = text.Substring(at).IndexOf(' ');
        string maybeEmailAddress =
            text.Substring(startAt + begin, (at - (startAt + begin)) + end +
    1);
        if (EmailHelper.IsValidEmailAddress(maybeEmailAddress))
        {
            ret  =  InternalParseResult.Succeed(startAt  +  begin,
                maybeEmailAddress);
            break;
        }
    }
    return ret;
}
```

The parsing module accounts for optional parameters and parameters that may themselves be commands by evaluating the results of the parameter type's parsing operation relative to the specifications on the parameter definition. If a command is found that has all required parameters provided, then it is tagged within the text with the data required by an executor. Commands that are found but rejected due to missing or invalid parameters, or outside the bounds defined on the command definition itself, are then tagged with assistance text to explain to the user why the possibly intended command wasn't interpreted as such (such tagged non-commands will be ignored by the executor).

An additional advantage of this aspect of the invention is the command parameter compiling logic. The next thing that the parsing operation does is to take the parsed commands and associated parameters and compile them into data that will be more meaningful to the executor. Every command has a unique ID (UUID) and every command is reduced to this ID. Likewise, many arguments can be reduced to a numeric ID or UUID that improves the efficiency of the executor.

For example, the parameter type "report name" looks for a valid name of a report in the step's text. If found, the system compiles down to the numeric ID of that report, so that it can be queried in the database by that ID (a 32-bit integer serving as the primary key of the reports table), which is more efficient than doing a text search on the report name.

Yet another advantage of this aspect of the invention is the ability to do text tagging. After a command and its associated parameters are parsed and compiled, they are tagged. By tagging, XML tags containing the requisite command and argument data are placed around the designated text.

An example is a text tag for a step of a procedure that reads as "Send an email to John Doe." In such an example, the text "Send an email" is tagged as the command, with the "John Doe" text providing a value for its second parameter. The word "to" and the terminating period are the syntactic sugar that makes the step more layperson friendly to assist non-developers in understanding what that step will do but will be ignored by the executor. The procedure editor and auditor will display the above as such: Send an email to John Doe. In the example above, the command may be bold-faced, and the parameter underlined. In this way, all the data meaningful to the executor is included in the step's text, but it is presented to the user as text formatting that allows the user to easily identify what that step will do based upon what the parser determined was the command and parameter(s).

The following is an example of the tagged text for a step on a procedure that reads "Send an email to John Doe.":

```
<k-command
    data-val="45936645-b91f-47b4-90bb-3ec727bd5e73"
    data-params="96950cab-28cd-49a2-9f8e-4efc8a007b17"
    data-helpers="">
Send an email
</k-command>
to
<k-param
    id="96950cab-28cd-49a2-9f8e-4efc8a007b17"
    data-val="[base64-enocoded binary argument data]"
    data-ord="2">
John Doe
</k-param>.
```

As can be seen, the text "Send an email" is tagged as the command, with the "John Doe" text providing a value for its second parameter. The word "to" and the terminating period are the syntactic sugar that makes the step more expressive to assist non-developers in understanding what that step will do, but will be ignored by the executor.

An additional aspect of the invention is command execution logic. When a procedure is executed, the executor simply reads the steps of the procedure and executes each step one by one. Just as each command has its own parsing information; it also has its own execution logic. So, in the example above, when executor encounters the "Send an email to John Doe" step, it will call up the "send email" command's execution method. The executor also handles the process flow of the procedure, handling go-tos, iterators, conditionals, etc. Procedures can call other procedures, and therefore the executor maintains an execution stack to properly handle both forward and backward (i.e., if the user hits the back button) progression/regression through called procedures; improving efficiency.

An advantage of this aspect of the invention is the modular BA commands. All BA commands are modular, meaning they are not integral to the system, and can be added or removed at will. BA commands can be grouped into libraries so that custom command sets can be built for a particular domain/industry and added as required. Additionally, a BA command does not need to reside within the hosted platform itself, but can be called via a RESTful API, so that consumers can build their own library of commands and not worry about losing control of their intellectual property while still utilizing the full power of the software.

Part of the contract ("interface", in typical OOP parlance) for the requirements of a BA command is command documentation. This aspect includes aliases, description, categories, further notes, and examples. Additionally, each parameter definition on the command also requires documentation as to what values are expected or allowed for that parameter. Thus, whenever a BA command is plugged into the system, its documentation is inherently available. If a new version of the command is published, updated documentation on the command's properties are likewise updated in the system. At any time, a report can be run that formats all the registered commands' documentation into a cohesive technical document, for either perusal or print, thereby ensuring that the system documentation is always up-to-date.

Yet another aspect of the invention is the kiosk user interface. The Kiosk User Interface ("KUI") is a new paradigm for user interfaces, designed for performance, stability, consistency, intuitiveness, and strict adherence to any business's internal controls. As the name implies, the KUI presents the user with a kiosk-style wizard interface. In the KUI, every business process can be handled via a kiosk or wizard interface. This means that whether a business process is out-of-the-box or completely custom built by the client (or any combination thereof), it will run as a kiosk (a utilitarian business process). This is made possible by the BA language, where, as each step is executed, the executor determines if user interaction is required. If so, the user is presented with an interface as defined by the programmed command of the current step, and the execution pauses until the user provides his or her input.

This paradigm shift yields a number of immediate benefits. For example, the KUI enables user interfaces to be made as simple as possible, given that each sequential page displayed to the user has only those controls (buttons, input fields, etc.) necessary for the given step, and are therefore easy to use. Additionally, the user interfaces created by the present system are much more stable and reliable due to their minimalist design.

Another advantage of the KUI system is that, due to the minimalist design, the UI easily comports to all screen sizes—mobile, tablet, widescreen, etc. (i.e., the KUI inherently runs on all devices without requiring any special coding for specific platforms or display sizes).

Yet another benefit is that users can execute any business process in the system with little to no training, as every process is presented as a simple walk-through from start to finish. Because there is no need for end-user training, there is no need to maintain user documentation. The system acts as the documentation and developers do not need to code anything for the user interface. By using the BA language, all KUI layouts are automatically determined by the specified commands and column types referenced on the procedure's steps.

Yet another aspect of the invention are the self-documenting procedures. Ideally, user documentation for business processes should provide simple, step-by-step guides for how to execute those processes. This is exactly what the system generates via user inputs. It therefore follows that if a client wants hard-copy documentation of the process, it is as simple as clicking a button. Just as the executor knows when user input is required and how the KUI is to be rendered based upon the commands and parameters, it can render that output to a static document instead of an interactive website or standalone application. This static document can then be printed and bound and serve as the documentation for the company. If and when those programmed businesses processes change, the user need only reprint the documentation. There is no need to update it, as, again, the system itself is the documentation. If the system gets updated, the documentation is inherently up-to-date and just needs to be reprinted.

Additionally, the documentation generated may be automatically transformed into other formats. For lower level end-users, many will want step-by-step instructions. But business managers, etc., may wish to see a flow chart depicting the overall process from which they can assess accuracy and completeness. This transformation of the end user documentation into a flowchart is easily achieved by the same methods described above and simply using blocks, lines, arrows, etc. to create the flowchart using various rendered screens of the actual user interface.

Still yet another aspect of the invention is the BA Report Writer. Rather than using the standard report writer design interface—e.g., a WYSIWYG layout of the page, where fields and controls are dragged and dropped into place—BA Reports use procedures (written in BA) to specify the report output.

Yet another advantage of the present invention is the availability of the BA language as a data modeler. During the execution of a procedure, list data may be displayed (filtered, sorted, grouped, and/or cross-tabulated); individual records ("Row Data") may be displayed; miscellaneous text may be displayed; etc. There is, then, essentially no difference between the output requirements of an executed procedure and what is required on a report (save interactive controls, such as buttons or data entry fields). Recognizing this, the present invention's reporting module allows the user to write reports in the exact same fashion as he would write procedures for execution, using the BA language to specify what is to be shown on the report. The report generator then follows the exact same logic as the execution module, making only slight modifications to the output as necessary (namely, stripping out interactive controls, adding formatting as needed, etc.).

This is advantageous because it makes writing reports trivial once one knows how to write procedures. There is no special training required for writing reports in the present system; no understanding of relational databases is required; no underlying BI tools necessary to link data; no complex development environment required to design the layout and data requirements of the report; etc.

An advantage of this aspect of the intention is the use of column possessives. Data modelers are required for report writing programs to operate because reporting on relational data requires, in almost every case, linking related tables together. Column possessives operate by any related data in the invention being denoted by columns of type "lookup". This column type indicates that it stores a pointer to a record (e.g., a row) in another table (e.g., a list).

A lookup column can be used for anything from simple dropdowns on data entry, to linking two datasets in a relationship (e.g., Master/Detail). Whenever data from a related list needs to be shown, there is no need to specify SQL joins or create diagrams visualizing how the relationships match up. Rather, the user simply specifies something like the following, as an example: "Kolli Items" is a list in a Master/Detail relationship with the "Kollis" table (the latter being the master, the former the detail). The system will display the data in the "Kolli" items list (Kolli being a term for a container, piece of freight, etc.), but also pull in a few pieces of information from the master list ("Kollis") itself—namely, the Kolli's "ALB Number" and "Status". The column named "Kolli" on the "Kolli Items" list is a lookup type. This means that it points back to the "Kollis" list. Hence, to get data from any columns in the "Kollis" list, we simply put an apostrophe (a "possessive") at the end of the "Kolli" column, and then specify the name of the column from the "Kollis" list.

Note that possessives can be chained indefinitely and also that column possessives apply not just to reports, but to any aspect of the invention that utilizes the BA language—procedures, activity templates, column constraints, etc.

Still more advantages of the invention exist in the availability, in whole or in part, of the integration of the various aspects discussed above into various hardware devices. The invention may be a cloud-based application, so it can be accessed from any internet-enabled device. It can therefore be used on everything from desktop computers, to mobile computing devices, and even handheld scanners.

The invention also supports cloud printing, so that reports can be printed directly to a designated printer without requiring user intervention (i.e., having to select a destination printer). This may be done for convenience purposes, but also sometimes for security purposes—e.g., forcing checks to print to a magnetic check printer or printer with pre-printed check stock.

In the case of custom devices, such as scanners, remote administration software may need to be installed for customer support. In this case, and in the case of cloud printing, certain ports will need to be open on the customer's firewall for this functionality to operate. However, it is very seldom that a vendor succeeds in convincing a customer's IT department to open ports on their public-facing firewalls. And even if success is achieved, it is rarely a quick or easy process. To avoid these issues, a solution for customers facing firewall/IT issues are stand-alone devices that run on their own network, parallel to the customer's network, and provide access only to the presently disclosed applications.

An advantage of this aspect of the invention is the ability to create a connected print station. The print station allows for cloud printing directly from the system without requiring involvement of the customer's IT department (installing printer drivers, opening up firewall ports, etc.). In one example, the core of the device may be a Raspberry Pi Model 3B. It runs a version of the Raspbian OS (currently Pixel) and is configured with Chromium to log into the Google Cloud Print service deployed for the customer's cloud printers. The printer is installed as usual on Raspbian (i.e., using CUPS), and registered with Google Cloud Print.

On the server side, the customer's Google Cloud Print deployment and printer are registered with the system (using Procedures). When the user runs a procedure or report that is designated for the printer, the system sends the print job over to the cloud printer provider (Google, in this case). Google then sends the print job to the Raspberry Pi, which sends it to the printer via the USB cable. In this example, the Raspberry Pi connects via Wi-Fi to a cellular hot-spot, constituting a parallel network separate from the customer's internal network. This avoids any firewall issues, yet still gives full functionality of the system. Additionally, the Raspberry Pi can be outfitted with a touch screen, and Raspbian locked down to only allow execution of the KUI printing web page in Chromium.

Another advantage of this aspect of the system is the availability of an office guest self-check-in based on the software platform. An "Office Guest Self-Check-In" device allows for automated security badge creation for visitors to a secured office environment. The device consists of four main components: a Raspberry Pi controller; a camera; a touch screen; and a label printer. In this example, the Raspberry Pi runs a version of Raspbian that is locked down so only Chromium can be executed, and only the KUI can be loaded. The page is logged in with the account designated for the guest check-in functions.

So, when setup occurs, a business user responsible setting up the system defines what information prompts will be shown to end users as part of the end user interface or standard user interfaces. After this setup occurs, each end user, in this case, employees needing an ID badge, can access the business software system via touchscreen which displays the information prompts to the business manager, etc. previously defined. The employee end user will be able to enter their information and obtain an ID badge with the system recording this information in the databases, updating employee reports, etc. The system can also be integrated with other software systems, in this example the software which controls the security locks in the office building. Therefore, once an end user creates an ID badge, the present system may communicate this information to the security lock system which will enable the end user to access certain areas of the building with their newly created ID badge.

Additional objects, advantages and novel features of the examples will be set forth in part in the description which follows, and in part will become apparent to those skilled in the art upon examination of the following description and the accompanying drawings or may be learned by production or operation of the examples. The objects and advantages of the concepts may be realized and attained by means of the methodologies, instrumentalities and combinations particularly pointed out in the appended claims.

BRIEF DESCRIPTION OF THE DRAWINGS

The drawing figures depict one or more implementations in accord with the present concepts, by way of example only, not by way of limitations. In the figures, like reference numerals refer to the same or similar elements.

DETAILED DESCRIPTION OF THE INVENTION

Figure 1A:
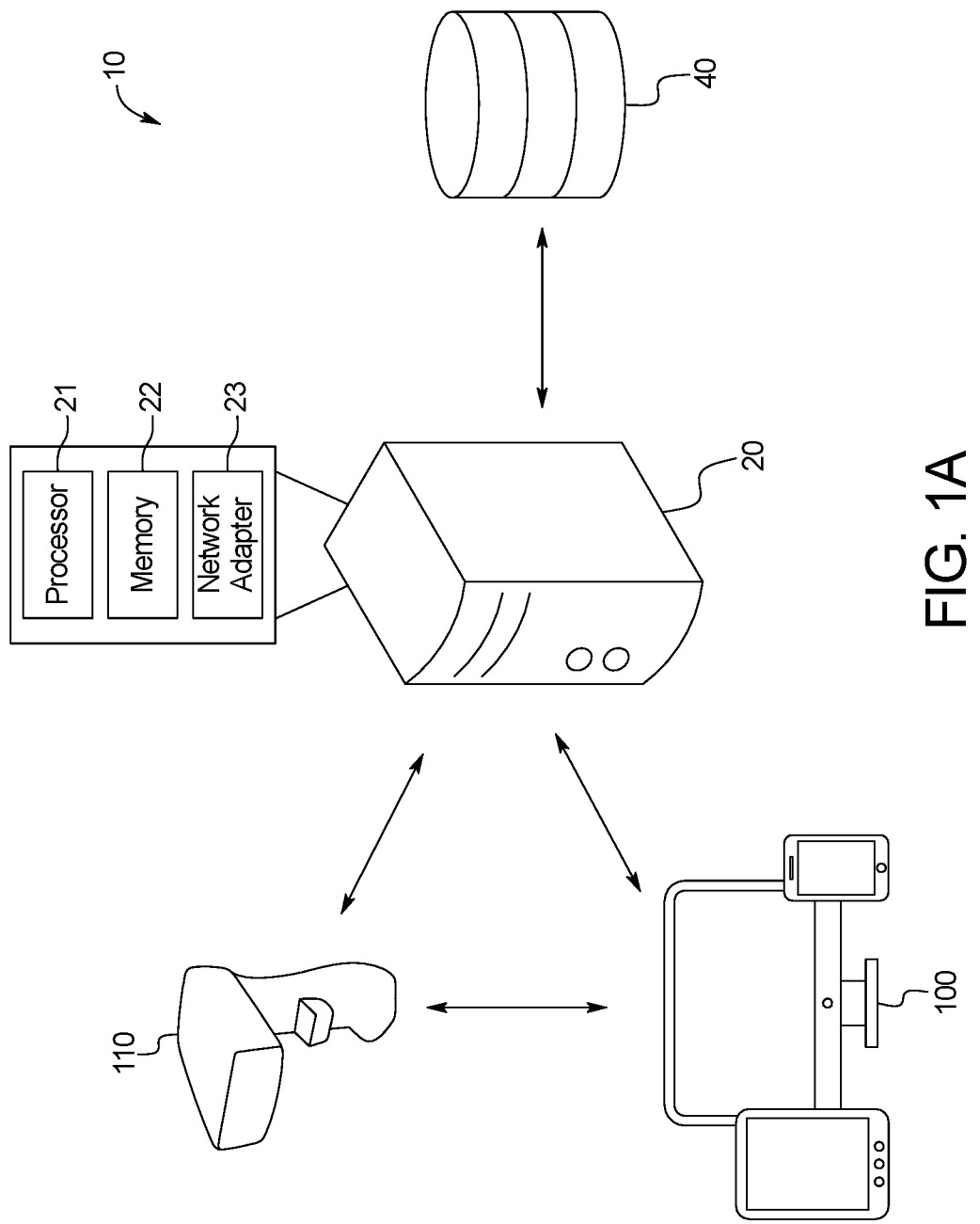
FIG. 1A is a schematic diagram of the components of a business software system.

FIG. 1A is a schematic diagram of the components of a business software system 10. As shown in FIG. 1A, a business software system 10 may include a centralized server 20, one of more database(s) 40, end user device(s) 100, and scanner 110. The centralized server 20 may include a processor 21, memory 22, and communications adapter 23. The processor 21 may act as a centralized controller which functions to execute computer code stored in the memory 22 of the server 20 as well as other sources of data, computer code, etc. received in by the communications adapter 23.

In this example of the business software system 10, there are one or more database(s) 40 which may be external or internal to the system 10 which communicate with the centralized server 20 to store and provide data to (and from) the centralized sever 20. The centralized server 20 may also store various computerized code which enables the one or more database(s) 40 to be provisioned, formatted, controlled, reformatted, and/or reconfigured based on end user input (see FIGS. 2, 3A, and 3B).

Such control is exerted by end users via their end user device(s) 100 which may be any computerized device capable of running a web or stand-alone application including: desktop computers, laptops, tablets, smartphones, etc. The end user devices 100 may run a stand-alone end user device application (see FIG. 4) or access a hosted, internet/intranet accessible website which enables control over the system 10.

In the example shown, the system 10 also features a scanning device 110 which may also run a stand-alone end user device application (see FIG. 4) or access a hosted, internet/intranet accessible website which enables control over the system 10. The scanning device 110 may also communicate information to the end user device(s) 100 and/or server 20 depending on the complexity of the scanning device 110. Scanning devices 110 are widely used in supply chain management, inventory management, etc. and are shown in this example to enable end users to scan and store data regarding shipments easily.

This system 10 configuration is handled by the system's 10 software which can be pre-configured to carry out basic tasks, but then updated in real-time to a specific company's needs. For example, the hardware drivers, etc. which enable the scanning device 110 to operate and communicate with the end user device(s) 100 may come pre-installed (or readily downloadable) upon the devices. Once activated, the system 10 may, in real-time, via its software create and/or update: the end user interface which end users interact with, user documentation, reports and alerts generated by the system, and even the underlying structure of database(s) 40 controlled by the system 10.

It should be noted that communication between the device components may be carried out via the internet or any other means of data communication including an internal network (e.g., intranet), Bluetooth, ZigBee, RF, NFC, Wi-Fi, etc.

Figure 1B:
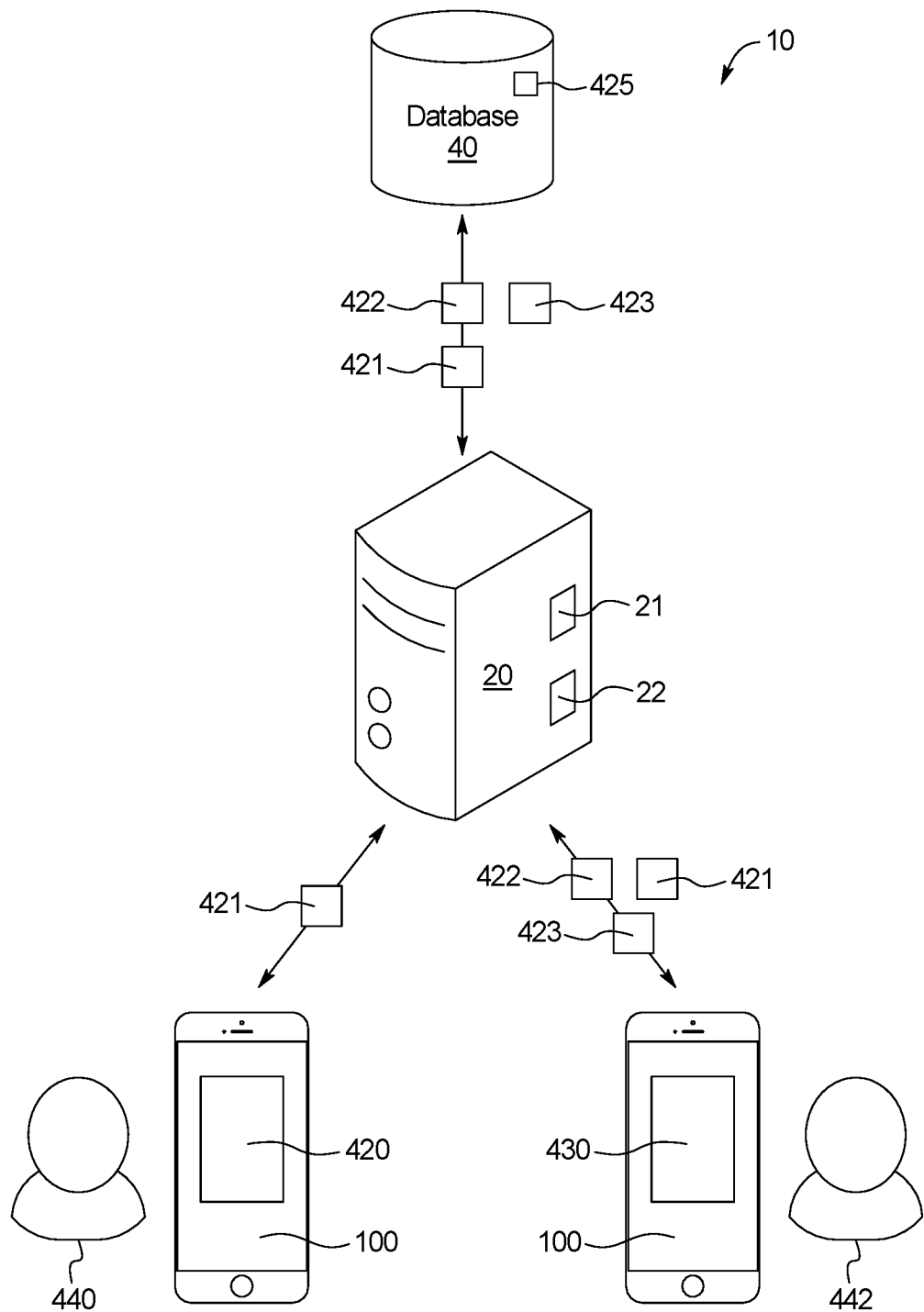
FIG. 1B is a schematic diagram of the business software system 10 being setup by a business user and accessed by an employee user

FIG. 1B illustrates the business software system 10 being setup by a business user 440 and accessed by a business employee 442. As shown in FIG. 1B, the system 10 may be set up by a business user 440 (e.g., a business owner, business manager, system administrator, etc.) via that user's end user device 100. The business user 440 is able to access screens of the system's initial setup GUI 420 that enables the business user 440 to identify a plurality of information prompts 421 which will be displayed to business employee end users 442 as part of the data collection GUI 430. The business employee end user 442 submits the one or more selected information prompts 421 to the centralized server 20 (specifically its processor 21 and memory 22) which then ascribes metadata tags 422 or other information to each information prompt 421 and stores the information prompt 421 and associated tags 422 within the database 40. The metadata includes a GUI structure to be used when presenting the information prompt 421 through the data collection GUI 430.

In addition to the information prompt 421 and related metadata tags 422, the database 40 includes code 425 to generate the data collection GUIs 430 using the information prompts 421 and the metadata 422. The data collection GUIs 430 display the information prompts 421 to the business employee end users of the system 10 in order to collect data 423, including a user response to the information prompt 421. The data 423 entered by the business employee users 442 is similarly transmitted to the centralized server 20 which is uploaded to the database 40 for storage. The coding 425 generates further data collection GUIs 430 based on the data 423 in addition to the information prompts 421 and metadata 422. The coding 425 is also used to generate reports, user documentation, and other such documentation that are displayed through a reporting GUI.

Figure 2:
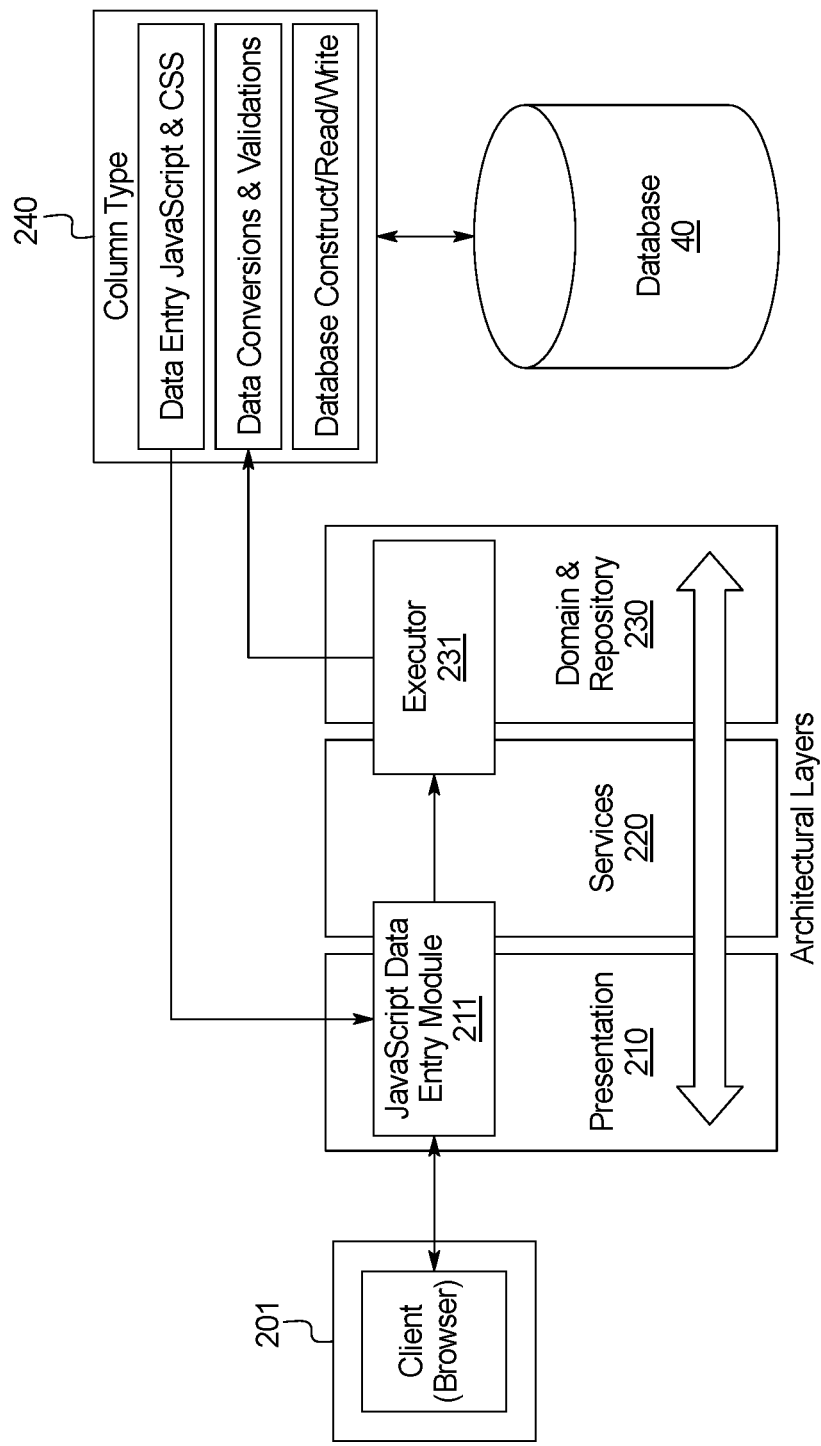
FIG. 2 is a schematic diagram of the architectural layers of the business software system shown in FIG. 1.
Figure 3A:
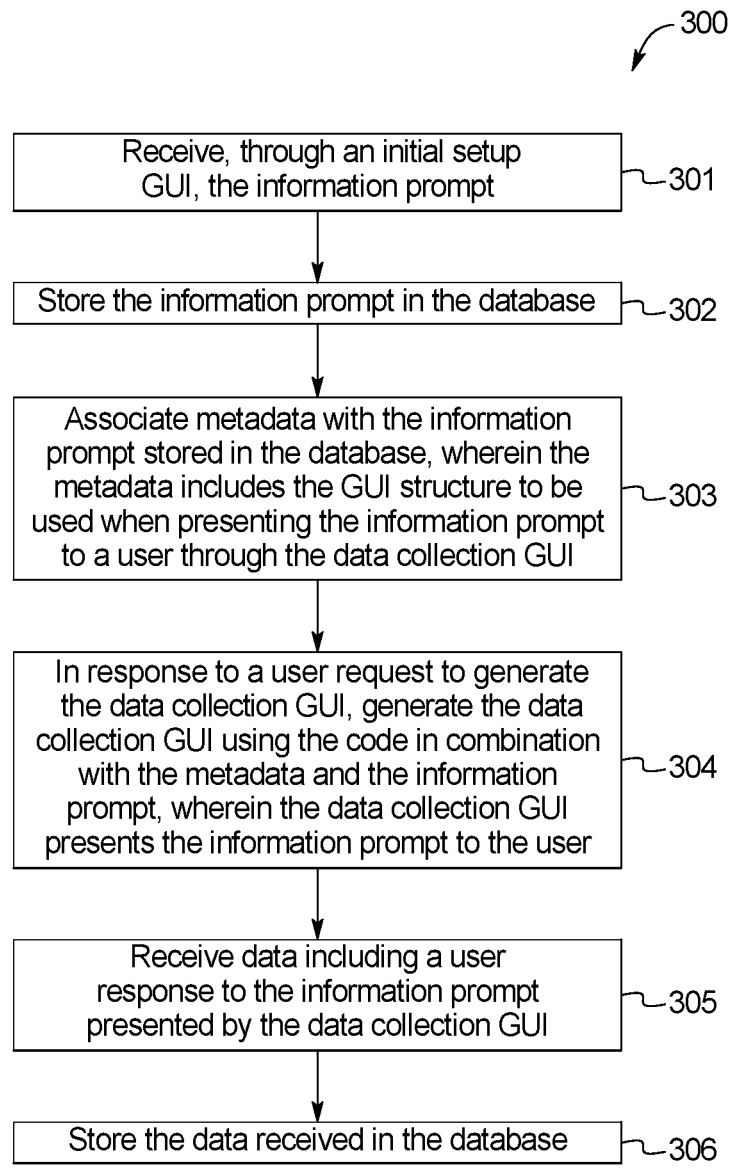
FIG. 3A is a flowchart illustrating steps in an example method of populating the database of the business software system of FIGS. 1A and 1B.

FIG. 2 illustrates the architectural layers of a business software system 10. As shown in FIG. 2, the business software system 10 may feature a series of software architectural layers ranging from the end user visible presentation layer 210, to the services layer 220, and finally domain and repository layer 230. The software architectural layers, in this embodiment, are stored upon the centralized server 20 (see FIG. 1), specifically within its memory 22 and accessed, in this example, via a client web browser 201 (see FIG. 2) which runs upon an end user device 100.

The client web browser 201 may enable end users to upload and alter data stored in the one or more databases 40 and also edit the structure of these databases 40 if they so choose. Such instructions are received via a JavaScript data entry module 211 in this example. The JavaScript data entry module 211 acts as an intermediary between the client and more technical machine language focused backend of the system 10. For example, if a company started collecting fingerprints as a form of package recipient identification, an end user may indicate via their client web browser 201 that this information should now be accepted and stored within the database(s) 40. Such an instruction will be received and transformed (to the extent needed) by the JavaScript data entry module 211 into executable code which can be acted upon by the execution module 231 which will in turn update the structure of the database(s) 40 columns, lists, rows, fields, etc. as needed to accommodate the fingerprint data.

In the FIG. 2 example, a new type of data is being accommodated by the database(s) 40 which calls for a new column type 240 to be accounted for by the system 10. To do so, the execution module 231 receives the update(s) from a business user (e.g., a system administrator, site manager, or another end user authorized to make such changes within the system 10) the database(s) 40 and handles complicated programing tasks such as data conversion and validation, reading/writing to the database construct, and data entry into the database via JavaScript, CSS, etc. Such updates also create a feedback loop with the client web browser 201 meaning that the system's graphical user interface (see FIG. 4) will be updated in real-time when a new database field for collecting a new type of data (e.g., a new entry prompt for fingerprint data) is added on the backend. Such an update also potentially automatically updates the user documentation, reports, etc. generated by the system 10 (see FIG. 7).

It should be noted the of software architectural layers shown are to demonstrate functionality of the system 10 and are in no way limiting upon the manner by which the system 10 may be programmed or operate.

FIG. 3 is a flowchart diagramming the steps of a method 300 for generating the standard user interfaces 430 of FIG. 1B. In step 301, the business user 440 identifies an information prompts 421 through an initial setup user interface 420. The information prompts 421 are then stored in the database 40 in step 302. In step 303, the system 10 associate metadata 422 with the information prompt 421 stored in the database 40, wherein the metadata 422 includes the GUI structure to be used when presenting the information prompt to a user through the data collection GUI. In response to a user request to generate the data collection GUI 430, the system 10 generates the data collection GUI 430 using the code 425 in combination with the metadata 422 and the information prompt 421, wherein the data collection GUI 430 presents the information prompt 421 to the user in step 304. In step 305, the system 10 receives data 423 including a user response to the information prompt 421 presented by the data collection GUI 430. In step 306, the system 10 stores the data 423 received in the database 40.

Figure 3B:
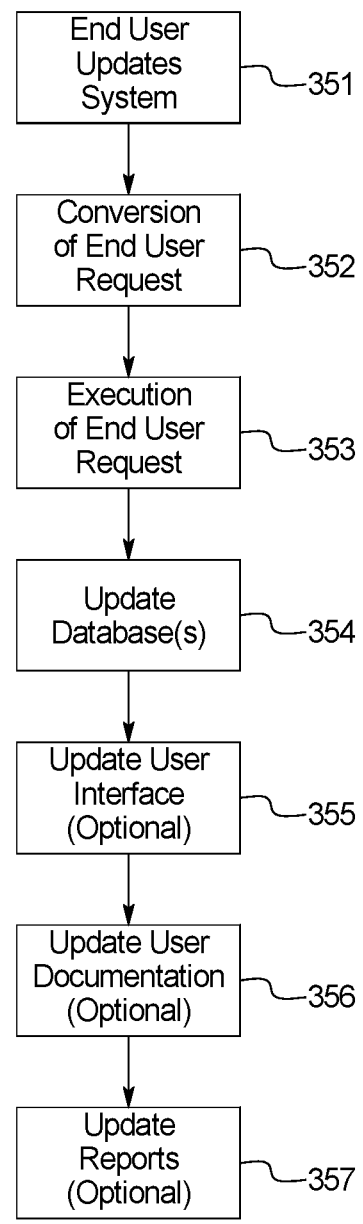
FIG. 3B is a flowchart illustrating a process in which the business software system updates itself based off end user input(s).

FIG. 3B is a flowchart which illustrates how the business software system 10 updates itself based off end user input(s). As shown in FIG. 3, at a first step 351 an end user updates the system 10. The update may be to the information stored by the system 10 (e.g., database records, etc.) but can also be directed to the type and manner by which the system 10 stores information (e.g., alterations to the underlying database structure). Any type of change may be carried out via a simplified end user interface (see FIG. 4). This end user interface may be traditional data input fields and/or a simplified programing language which enables the system's 10 user interface, databases 40, reports, documentation, etc. to be easily edited by a lay person (e.g., someone who does not know JavaScript, CSS, etc.).

This simplified programing language is referred to herein as a business assembly language (BA). It is a natural language ("plain English") domain-specific language that allows for rapid development and evolution of business applications, easy auditability of business processes, including system and process controls, and streamlined integration with custom software and third-party applications. BA is easy to learn and can be mastered by non-programmers with minimal training. Moreover, BA can be indefinitely extended by plugging in custom-built business logic written in any language.

At step 352, the system 10 takes the end user's system 10 update (in the form of a BA command, traditional user interface inputs, etc.) and converts the command into a more complicated machine language input such as JavaScript, CSS, Java, etc. which is then actioned by the system 10 at step 353. Execution of the end user's input is carried out by the processor 21 of the centralized server 20 in this example and results in one or more updates to the system's 10 databases 40 (step 354).

The update to the system's 10 database(s) 40 is carried out in real-time with the end users being able to update data stored within the database but also update the database structure based off their inputs. For example, continuing the example from FIG. 2, if an end user no longer wishes to accept fingerprint data they may utilize the graphical user interface (see FIG. 4) to make such an edit. The end user would access their instance of the client web browser 201 and submit the change. Once the change is input, the system 10 then updates the existing database structure (e.g., remove the database field, rows, tables, etc. which capture fingerprint data) and then also updates the corresponding portions of the user interface (step 355), user documentation (356), and/or reports (357). Continuing this example, the screen(s) of the graphical user interface 400 (see FIG. 4) which capture finger print data would have these elements removed. This is also true of the reports, alerts, and user documents generated by the system 10; which will no longer display the finger print data (if they previously did).

Figure 4:
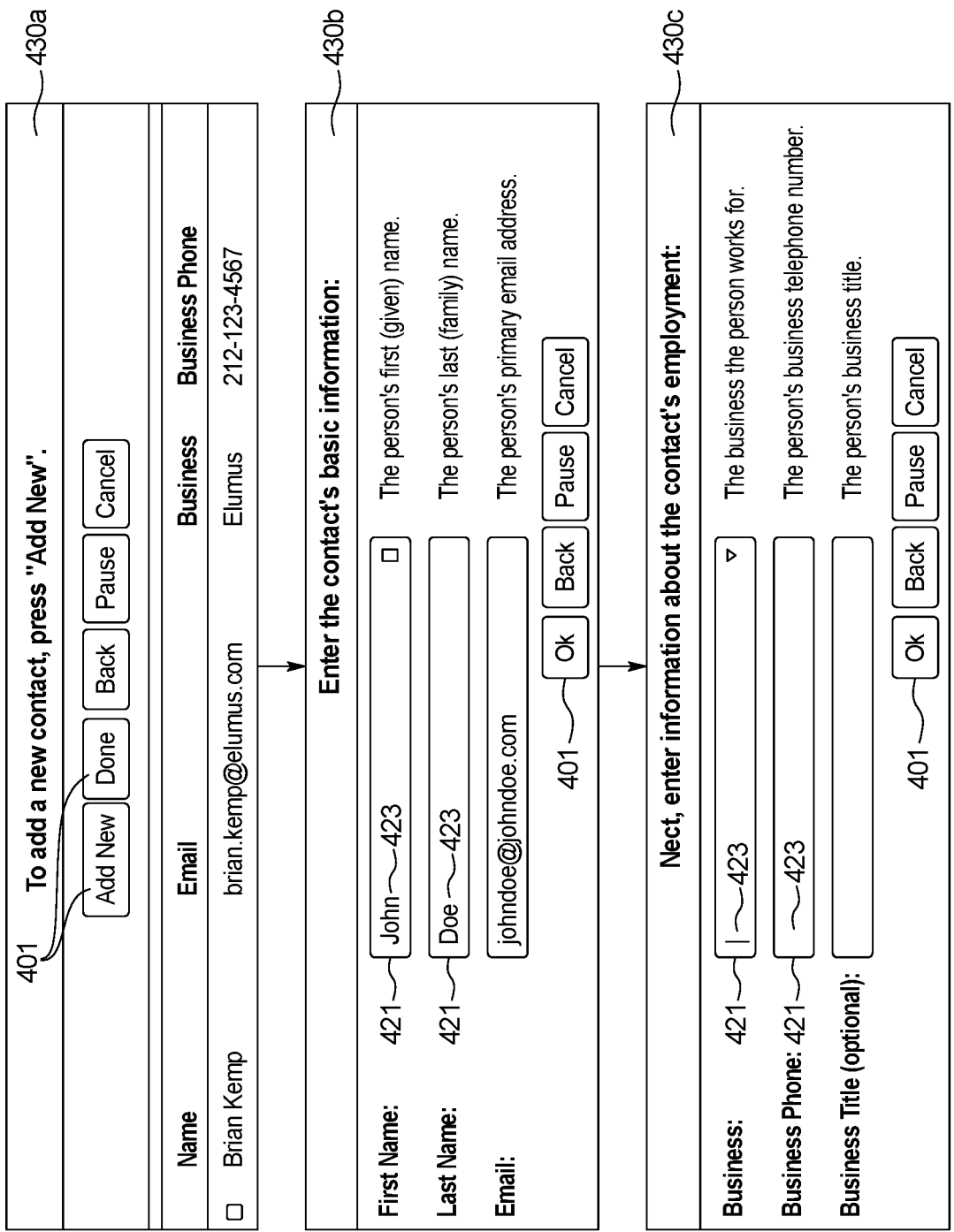
FIG. 4 is a series of example screens from the business software system's graphical user interface.

FIG. 4 is a series of example standard user interfaces 430a-430c, which is displayed within the client web browser 201 (see FIG. 2) or upon a standalone end user device 100 application may display a series of screens which enable end users to record information within the system's database(s) 40. User interface 430a illustrates a data entry screen for entering contact information. Selection of traditional data entry buttons 401 such as "Add New" leads to a subsequent user interface 430b that provides information prompts 421 to collect data 423 such as the first name, the last name, and the email address of the new contact in standard user interface 430b and the business name, phone number, and title in standard user interface 430c. Once entered, this data 423 is stored in the system's database 40, may be presented in subsequent standard user interfaces 430 based on the coding 425 in the database 40, and may be visible on relevant reports and other documentation.

It should be noted the data entry screens pictured in this example can be just as easily created and altered within the system 10 as the contact data itself. For example, if a business user 440 (or a business employee user 442, if applicable) wishes to no longer collect business phone numbers and rely solely on email addresses, the user 440 can alter the data entry fields 423 which are displayed upon the graphical user interfaces 430. To do this, the business user 440 again navigates the initial setup user interface 420 which enable the data entry screen's format, appearance, and/or content to be edited. The business user 440 may then opt, again via traditional button 401 and data entry field 402 controls to remove, add, or edit various fields present on the data entry screens (in this example). Once the field for the business telephone number has been removed via these controls, the system 10 deletes the associated information for this data entry field in the corresponding database 40. The system 10 can also retain previously recorded data for a removed data entry field 402 depending on how a given instance of the system 10 is configured.

Once the data entry screen's format is updated by a business user 440, any reports, alerts, or user documentation related to the removed and, in this example, interactive elements of a GUI 430 screen are updated. This means that, for example, if a report that includes data such as contacts, business telephone numbers, and the number of times they had been called at that number was previously available, the system 10 will update the report to remove the business telephone number or potentially not show that report at all (depending on how the rest of the system 10 is programmed).

It should be noted that for more advanced users, edits to the graphical user interfaces 400 appearance, etc. may be handled by use of simplified programming code (BA language). The BA language, as discussed previously, may enable more complex changes to be enacted upon a given instance of the business software system 10. For example, while any end user can alter the appearance of each screen of the graphical user interface 400, commands entered in the BA language (or another) may enable instance wide changes to be implemented more quickly, with the system also updating reports, user documentation, etc. in real-time as these changes are made.

Figure 5A:
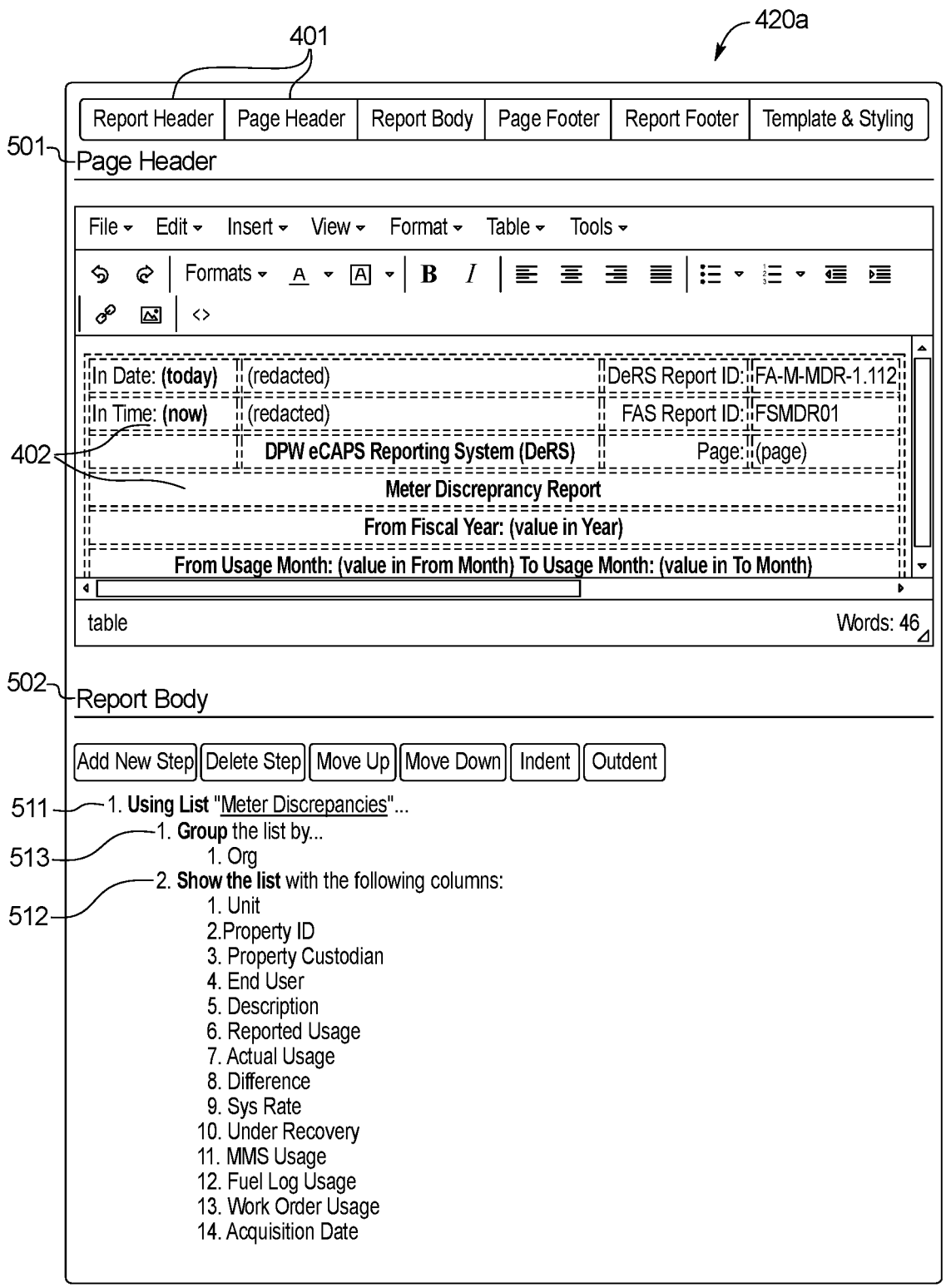
FIG. 5A is a screen of the business software system's graphical user interface within which the content and formatting of a report generated by the system may be altered.
Figure 5B:
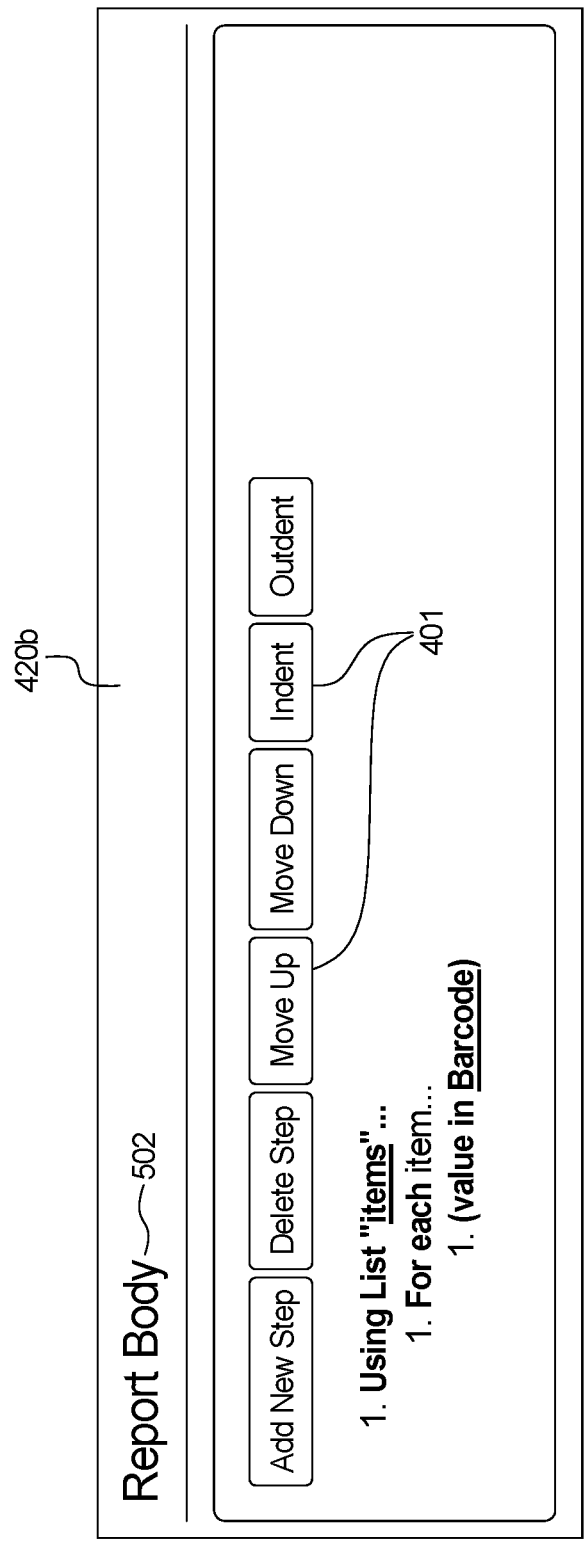
FIG. 5B is a report body editor screen of the business software system's graphical user interface within which the content and formatting of a report generated by the system may be altered via control buttons.

FIGS. 5A and 5B are example initial setup user interfaces 420a, 420b of the business software system 10 that allows for altering the content and formatting of a report generated by the system 10. As shown in FIG. 5A, the user interface 420a includes buttons 401 and fields 402 for modifying presentation, formatting, and other information within the report such as the header and footer of the report without the needs for complicated coding in JavaScript, CSS, etc. Instead, the end user can use the plain English business assembly language to create, alter, or delete a reports content and formatting. In this example, the header of a single page of report is altered via the page header editor 501 (accessed from a corresponding button 401) with the report body editor 502 displayed simultaneously (also accessed from a button 401) upon the report editing screen of the graphical user interface 420a.

Formatting of the report body within the report body editor 502 is done via the business assembly language which enables an end user to input basic plain English commands which will result in a report featuring data which would normally require complex SQL queries. For example, in the list command entry 511, the business user 440 identifies which database table within the database 40 will be used as the source for the information for this report. The list command entry 511 in business assembly language indicates to the system 10 that it should query the specified list within the system's 10 databases 40. In the context of the present system, a list is a schema definition of data to be stored in a database 40, along with the data stored in that schema. This means that a list is generally synonymous with a table used in relational databases. Columns are the constituent component of a list, and are generally synonymous with fields of a relational database. Therefore, in the present example, when the list command entry 511 is used within the report body editor 502 with the addition of the column command entry 512, they system 10 knows to query the list (e.g., database table for "Meter Discrepancies") and include only the specified columns (e.g., fields from the specified database table). Further commands in the business assembly language can also control the formatting of the report generated, in this example the group command entry 513 indicates to the system 10 it is to format the list by the organization column.

In FIG. 5B, the initial setup user interface 420b is a report body editor 502 screen within which the content and formatting of a report generated by the system 10 may be altered via control buttons 401. As shown in FIG. 5B, the content and formatting of a report generated by the system 10 may be altered via the control buttons 401. Specifically, commands in the business assembly language can be added, deleted, or moved around the report body via the control buttons 401. In this example, the BA language is used to generate a report that displays the barcodes for all "items" (whatever they may be) in the database(s) 40.

It should be noted that the report generated may be used to control other system 10 components. For example, if a networked printer was to print barcode labels for all items within the system's database, the system 10 could generate a CSS or other complex coding command based off the simplified BA language to control integration with the printer, etc.

It should also be noted that the reports generated can contain graphs, charts, figures, etc. generated off data stored within the database(s).

Figure 6:
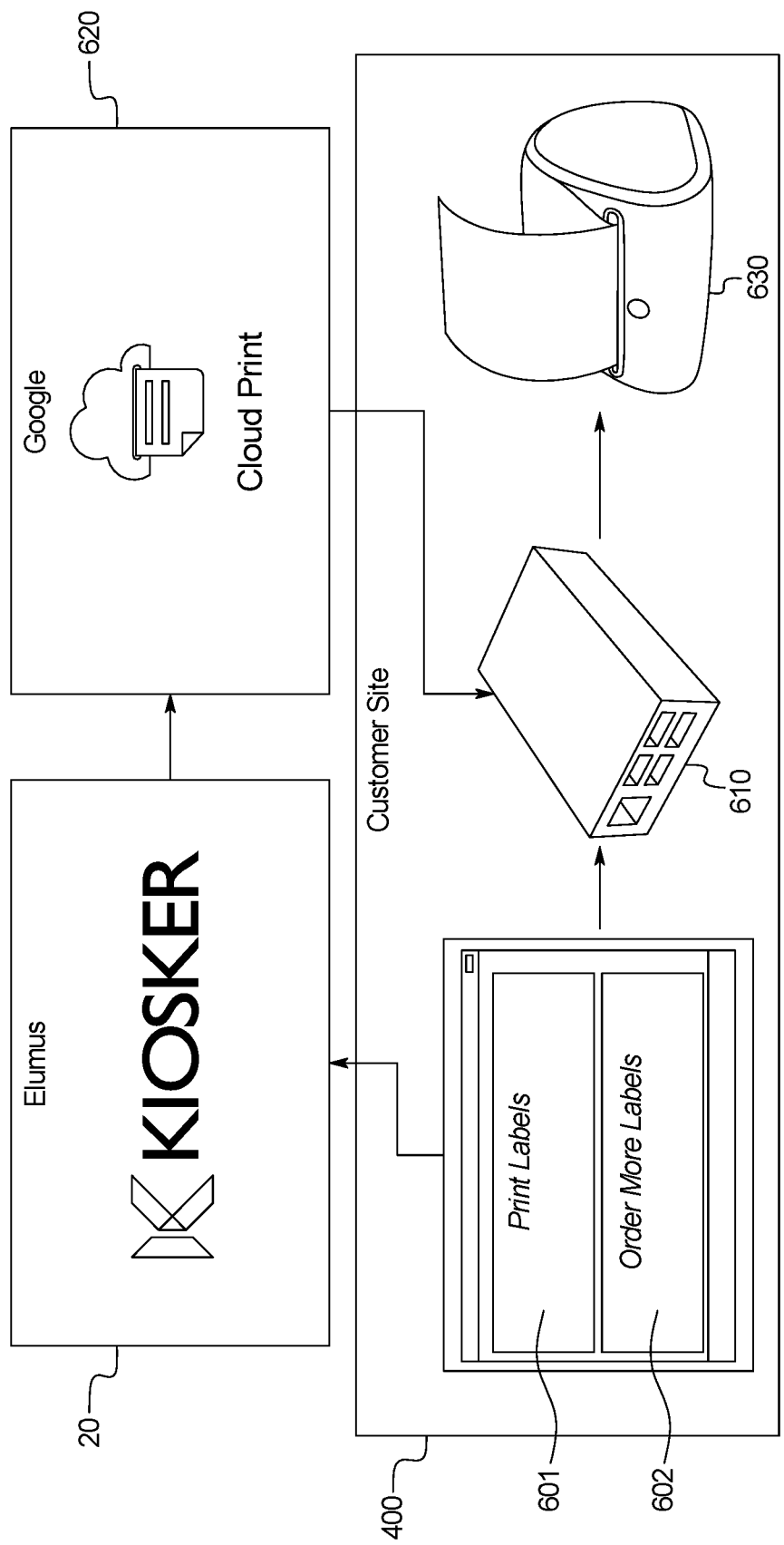
FIG. 6 is a diagram demonstrating how the business software system integrates with cloud-based technology and networked devices.

FIG. 6 is a diagram demonstrating how the business software system 10 may be integrated with cloud-based technology, as well as networked devices. Many businesses require the printing of large numbers of shipping labels, inventory labels, etc. In the example shown, the business software system 10 is configured to display a graphical user interface 400 which is capable of generating labels or ordering more labels. The set-up of this graphical user interface is controlled by the end user(s) business software system 10 (see FIG. 3) as is the report generated by clicking the Print Labels button 601 which is eventually printed. In this example, the centralized server 20 seen in FIG. 1 is replaced in part with a cloud-based solution (Google Cloud Print 620) which communicates with a simple controller 610 (a Raspberry Pi) to control a printer 630. The Raspberry Pi controller 610 shown may be programmed to display the GUI 400 as part of a local kiosk setup, or only receive signals from cloud-based printing solution 610.

The various tasks or procedures shown in this example are enabled by this instance of the system 10, so those tasks and procedures can be wrapped into any of the customer's business processes as necessary. For example, if a user clicks the "Order More Labels" button 602, this request can be sent to a procurement procedure for approval, automatically generate an order, email the request to a manager, etc.

Figure 7A:
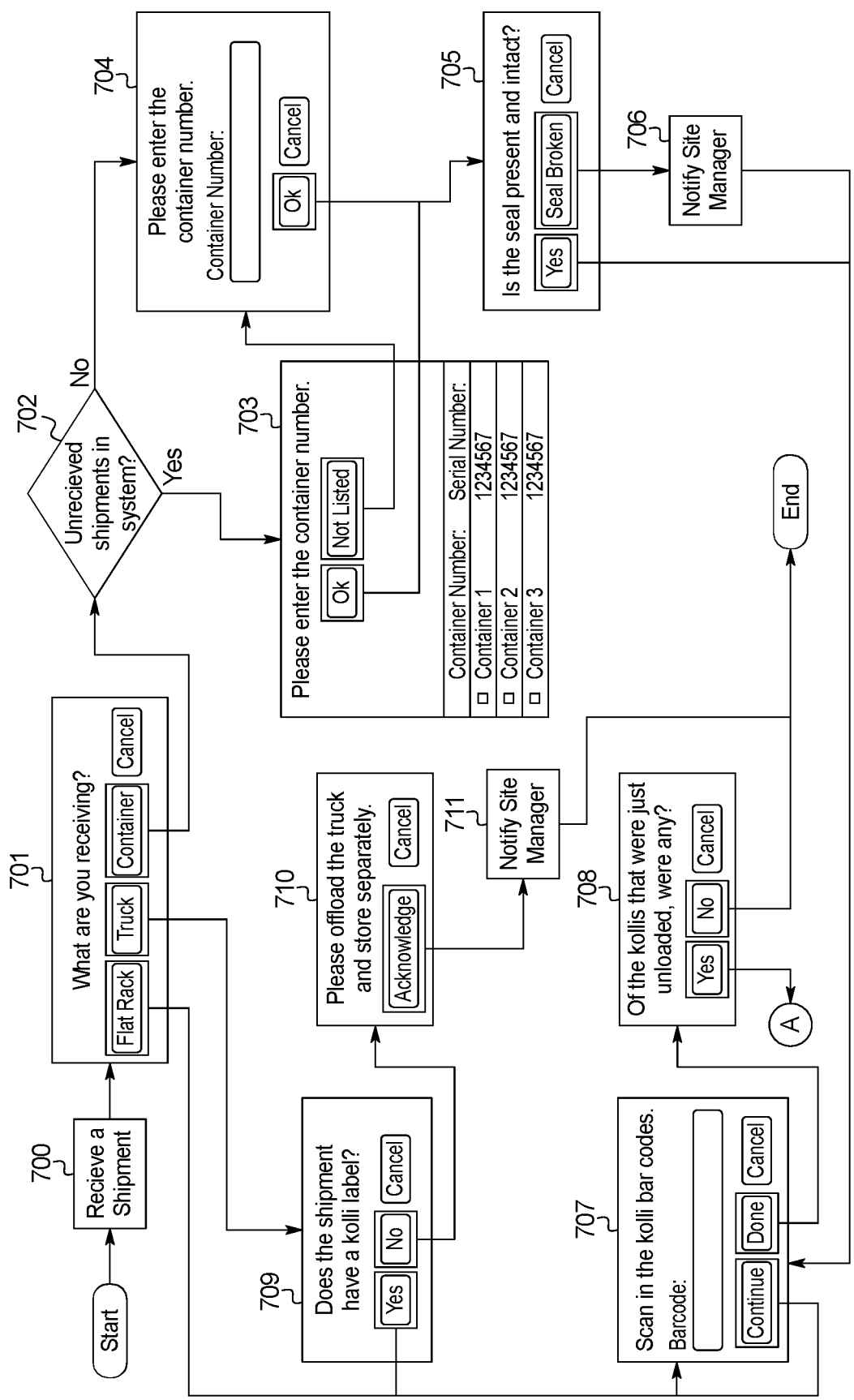
FIG. 7A is a flowchart of the graphical user interface screens of a business software system displayed to an end user receiving a shipment.

FIG. 7A is a flowchart of the graphical user interface 400 screens of a business software system 10 displayed to an end user receiving a shipment. To start, a business employee (e.g., warehouse worker) opens the receive shipment process (step 700) within the graphical user interface 400 of the user's end user device 100 or scanner 110 and then selects whether the shipment being received is a flat rack, truck, or container (step 701). If it is a container, the system 10 determines whether there are any pending unreceived shipments recorded in the system's database(s) 40 (step 702). If there are pending unreceived shipments recorded in the system's database(s) 40 (step 702), the system 10 displays a screen which enables the end user to select the pending unreceived shipment's record (step 703). If there are no pending unreceived shipments recorded by the system 10, or the shipment received does not match the pending unreceived shipments currently recorded, the end user is displayed a shipment serial number entry screen (step 704). After the shipment is selected from database records or entered by the end user, they are then prompted to confirm if the shipment's seal is intact (step 705). If the seal is indicated as being not intact, the system 10 will generate an alert and send it via SMS, text, email, etc. to the site manager(s) step 706. After the seal integrity screen, the end user(s) will then be shown a screen which enables them to scan in the bar code of each Kolli, sub-container, piece of luggage, etc. or enter the bar code manually if need be (step 707). After all Kollis which make up a given shipment are unloaded, the system 10 will then display a screen which enables the end user to indicate if any of the Kollis were damaged (step 708). If no Kollis are damaged, the receive a shipment transaction/process ends with the appropriate reports, alerts, etc. being generated in response to entry of this information into the system 10. If one or more Kollis are damaged, the user is routed to the damaged Kolli information entrance screen (see FIG. 7C, step 732).

If the shipment received is a truck instead of a container, as indicated at step 701, the system 10 inquires whether this shipment has a label (step 709). If there is no label, the system 10 informs the end user to offload the truck and store this shipment separately (step 710). The system will also notify the site manager(s) if this is the case (step 711). If the truck shipment does have a label, the end user will be directed to the Kolli bar code scanning screen (step 707) and follow the same progression as Kollis received as part of a container.

Finally, if the shipment received is a flat rack (indicated at step 701) instead of a truck or container, the end user, in this example, will be asked to enter or scan the Kolli bar codes (step 707) and again follow the same series of scenes from step 707 as truck and container shipments.

It should be noted that the screens shown can also represent the user documentation and reporting flowchart generated by the system 10 for this task. Since the present system 10 is focused on generating the most utilitarian business software possible, the screens shown represent not only the GUI 400 but also the process and manner by which the system 10 operates to receive a shipment (in this example). It follows that, user documentation can be easily generated which walks end users through the GUI 400 screens they will be shown as well as high-level process flow diagrams which enable managers to review the efficiency of a given process.

Figure 7B:
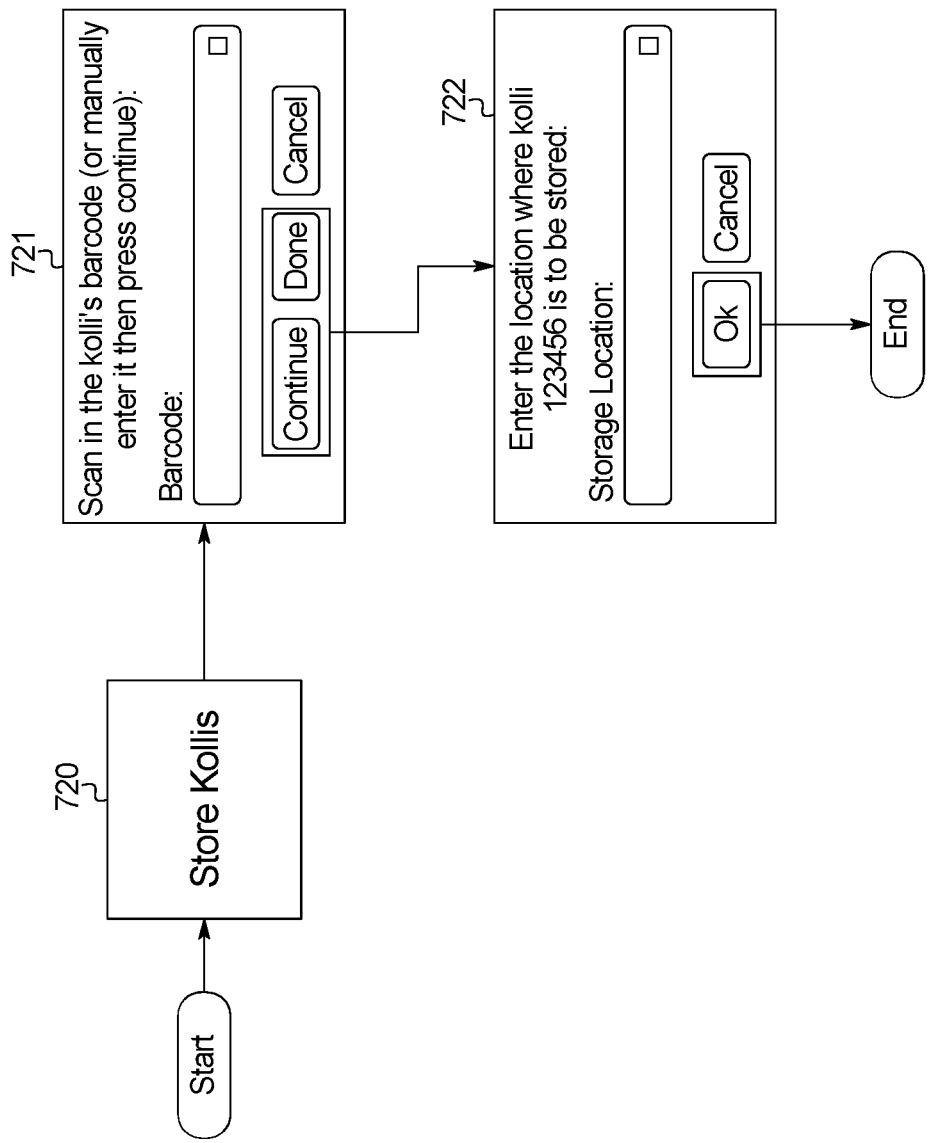
FIG. 7B is a flowchart of the graphical user interface screens of a business software system displayed to an end user storing Kollis in a warehouse.

FIG. 7B is a flowchart of the graphical user interface 400 screens of a business software system 10 displayed to an end user storing Kollis in a warehouse. Once a shipment of Kollis is received, presumably at the loading dock of a warehouse, it will then need to be stored within a given warehouse. To do so, end users first access the store Kollis process (step 720) within the graphical user interface 400 of their end user device 100. After this, the end user is shown a screen which enables the user to scan or manually enter the barcode of a Kolli (step 721). Once the barcode(s) are entered, the end user is shown a screen which enables the user to enter the physical location of the shipment within the warehouse (step 722). Once data entry is completed, this data is available on inventory reports, etc.

Figure 7C:
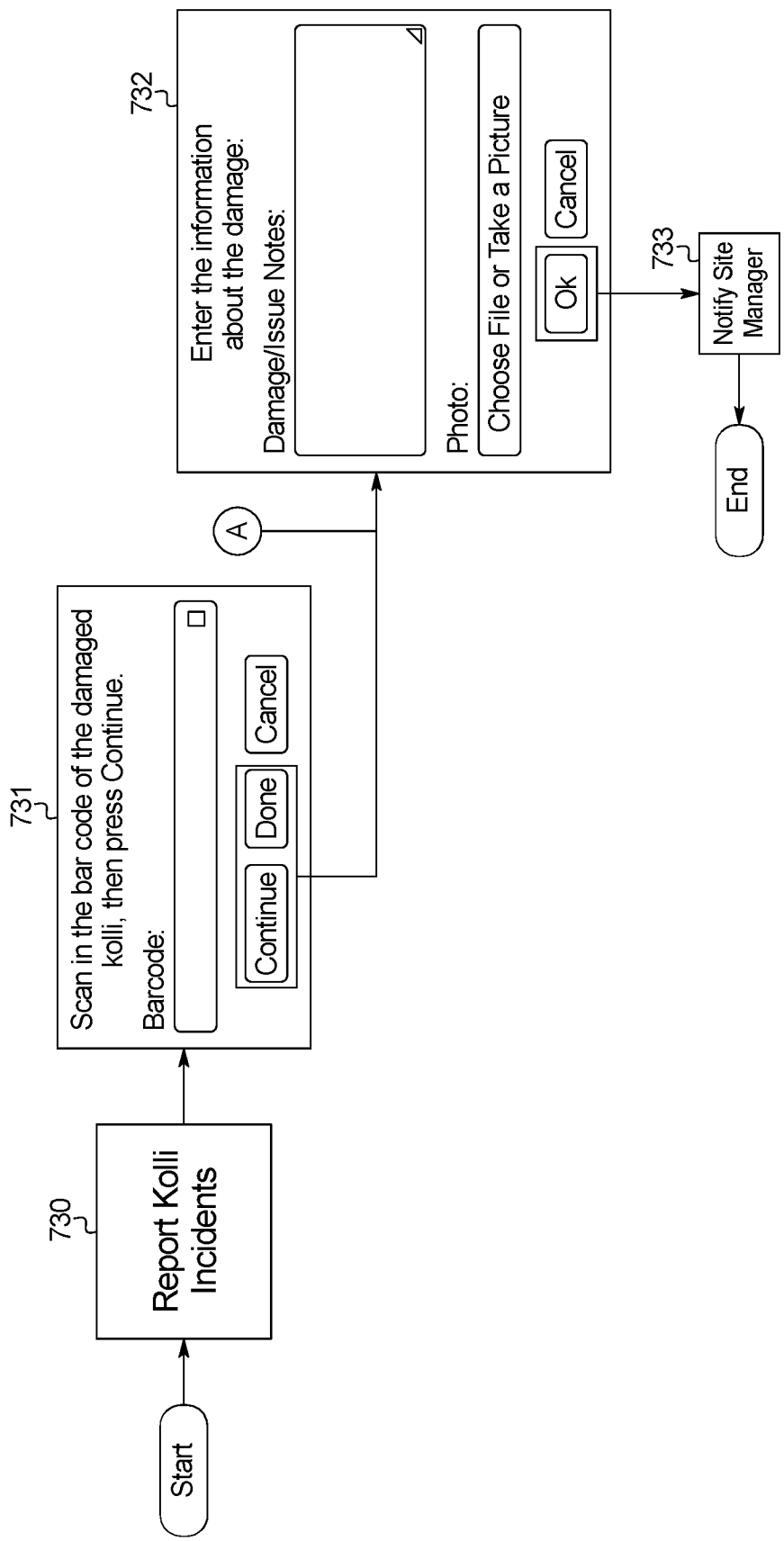
FIG. 7C is a flowchart of the graphical user interface screens of a business software system for a damaged Kollis reporting process.

FIG. 7C is a flowchart of the graphical user interface 400 screens of a business software system 10 for a damaged Kolli reporting process. As shown in FIG. 7C, if a Kolli is dropped, damaged, etc. the end user can report these details via the report Kolli incidents process accessible from the system's graphical user interface 400. To start, the user selects the report Kolli incidents process (step 730) which then displays a GUI 400 screen which enables the end user to scan or manually enter the damaged Kolli bar code (step 731). After this screen, a free response screen in which users can type an incident report and upload photos is displayed (step 732). After this information is submitted, the system 10 generates an incident report and send this notification to the site manager (step 733) for resolution, if needed.

Figure 7D:
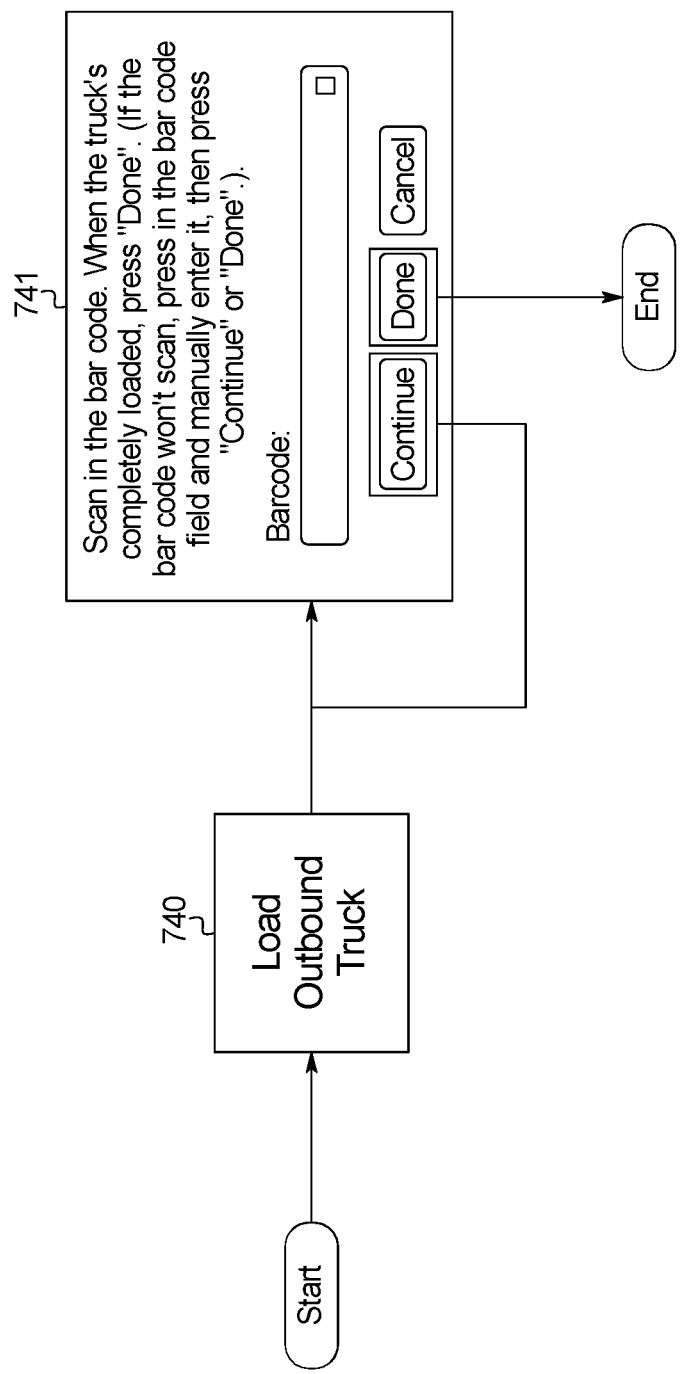
FIG. 7D is a flowchart of the graphical user interface screens of a business software system for an outbound truck loading process.

FIG. 7D is a flowchart of the graphical user interface 400 screens of a business software system 10 for an outbound truck loading process. As shown in FIG. 7D, if an end user wishes to load an outbound truck, the user indicates as much upon their end user device (step 740) and are then displayed a screen which enables the user to record the barcodes for all Kollis leaving a given location (e.g., outbound shipment from a warehouse) (step 741).

Figure 7E:
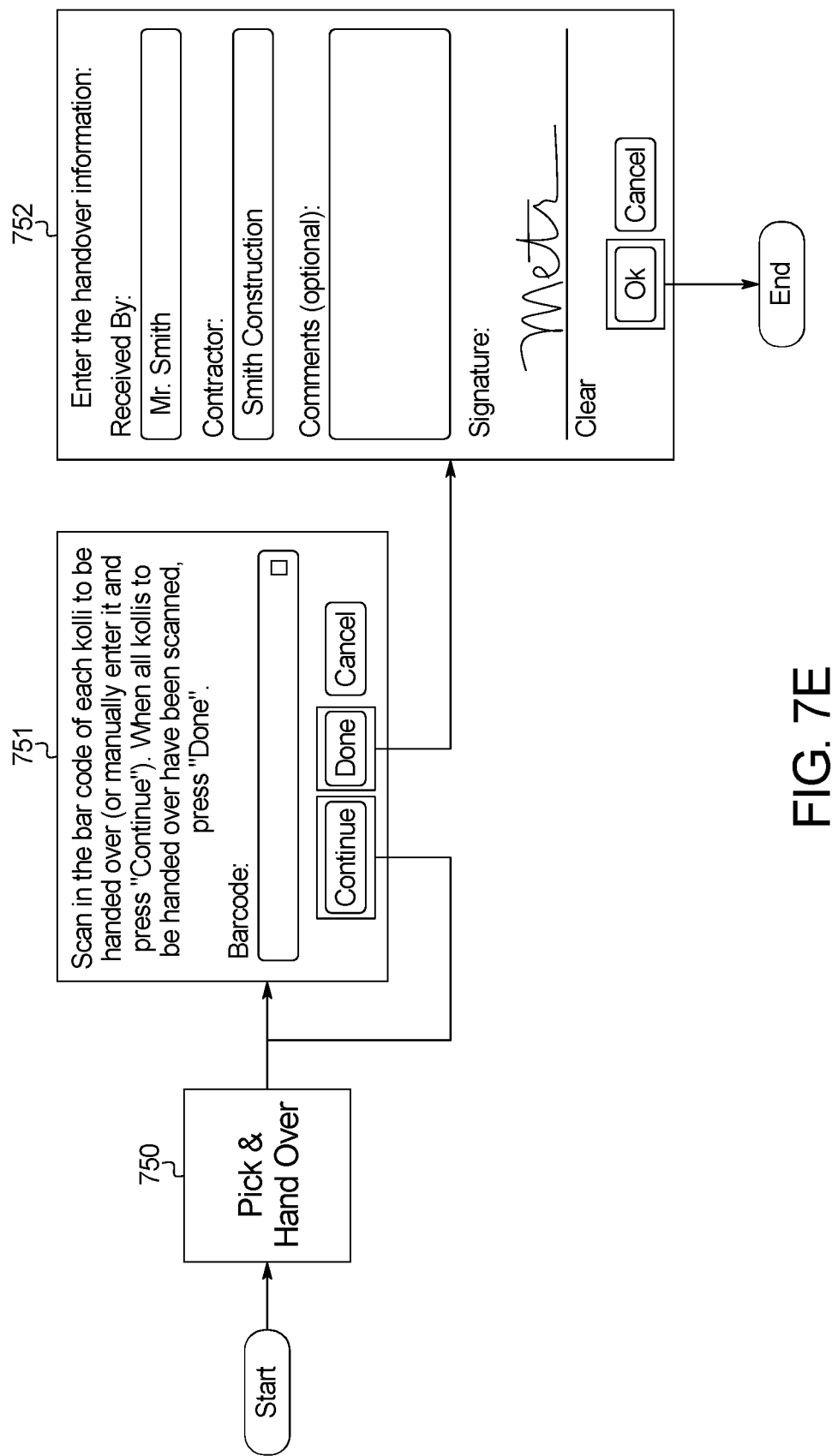
FIG. 7E is a flowchart of the graphical user interface screens of a business software system for a pick up and hand over process.

FIG. 7E is a flowchart of the graphical user interface 400 screens of a business software system 10 for a pick up and hand over process. As shown in FIG. 7E, the present invention facilitates the selection and vend of an item from inventory to a contractor. In this example, the end user first selects the pick-up and handover process (step 750) and then proceeds to scan the barcode of a Kolli to be handed over (step 751), at which point the worker handing over the Kolli inputs information regarding the handover (including collecting the recipient's signature) before completing the hand over (step 752).

Figure 7F:
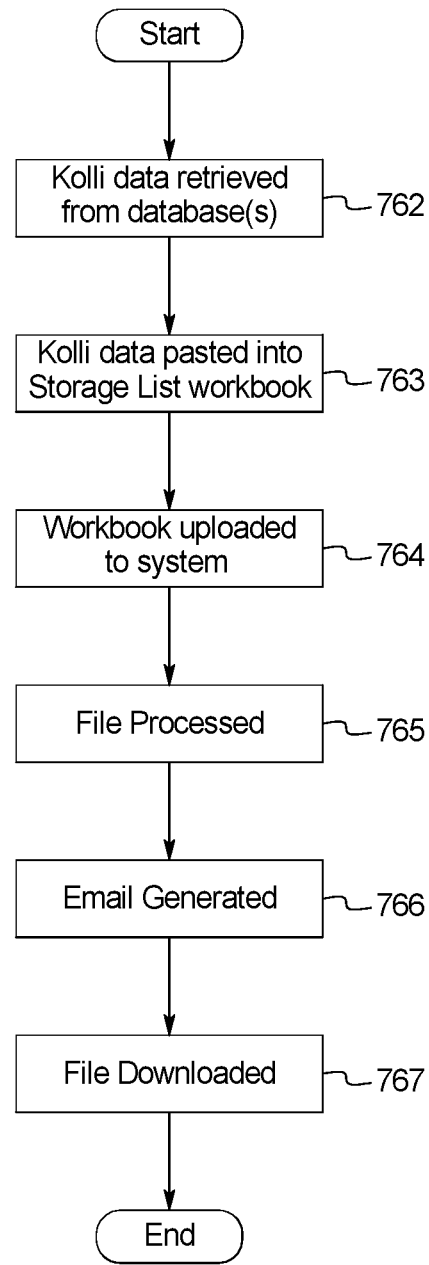
FIG. 7F is a flowchart illustrating storage list synchronization.

FIG. 7F is a flowchart which illustrates storage list synchronization. In this example, the storage list is formatted as an Excel workbook which is updated by a site manager or other personnel. To do this, the system first retrieves the Kolli data from an external database (step 762). This data is then pasted, by the system 10, into an Excel workbook (step 763). The workbook is then uploaded to the system 10 for synchronization (step 764). The file is then processed by the system 10 (step 765) and when synchronization is complete, the system emails a link to the site manager end user to download the synchronized workbook (step 766). The site manager can then download and review the synchronized workbook (step 767), upload it to other systems, etc.

It should be noted that various changes and modifications to the presently preferred embodiments described herein will be apparent to those skilled in the art. Such changes and modifications may be made without departing from the spirit and scope of the present invention and without diminishing its attendant advantages.

The invention claimed is:

1. A system comprising:
   a controller;
   a database controlled by the controller;
   a memory in communication with the controller, wherein the memory includes:
   an end-user executable code that, when executed on an end-user device, generates a data collection graphical user interface (GUI) using one or more information prompts and stores data received through the data collection GUI in a database structure; and
   a business software management code that, when executed on an end-user device, provides a user update entry GUI for modifying the end-user executable code by providing instructions relating to the one or more information prompts;
   in response to executing program instructions associated with the business software management code, the controller:
   receives, via the user update entry GUI, a user update to modify the end-user executable code, wherein the user update is provided in a business assembly language;
   converts the user update to a machine language input; and
   in response to the machine language input, modifies the end-user executable code and/or the database structure;
   in response to executing the program instructions associated with the modified end-user executable code on the end-user device, the controller:
   generates a data collection GUI using one or more information prompts according to the modified end-user executable code; and
   stores data in the database structure according to the modified end-user executable code.

2. The system of claim 1, wherein the end-user executable code further includes a reporting GUI structure to be used when presenting the stored data and, in response to a request to report the data in the database, the controller generates a reporting GUI using the code and the data.

3. The system of claim 2, wherein the reporting GUI structure to be used when presenting the stored data includes a graph.

4. The system of claim 2, wherein the reporting GUI structure to be used when presenting the stored data includes a chart.

5. The system of claim 1, wherein the end-user executable code further includes program instructions which generate an alert, the alert including a user response.

6. The system of claim 5, wherein the alert generated is an SMS message.

7. The system of claim 5, wherein the alert generated is an email.

8. The system of claim 1, wherein data in the database structure includes a user response received in response to the information prompt presented by the data collection GUI, and wherein the user response stored in the database is transmitted to another computerized system.

9. The system of claim 1, wherein the information prompt presented by the data collection GUI includes a JavaScript element.

10. The system of claim 1, wherein data in the database structure includes a user response received in response to the information prompt presented by the data collection GUI, and wherein at least one user response stored in the database is acquired from a barcode scanner.

11. A method comprising:
providing:
  a controller;
  a database controlled by the controller;
  a memory in communication with the controller, wherein the memory includes:
    an end-user executable code that, when executed on an end-user device, generates a data collection graphical user interface (GUI) using one or more information prompts and stores data received through the data collection GUI in a database structure; and
    a business software management code that, when executed on an end-user device, provides a user update entry GUI for modifying the end-user executable code by providing instructions relating to the one or more information prompts; and
executing program instructions associated with the business software management code, causing the controller to:
  receive, via the user update entry GUI, a user update to modify the end-user executable code, wherein the user update is provided in a business assembly language;
  convert the user update to a machine language input; and
  in response to the machine language input, modify the end-user executable code and/or the database structure;
executing program instructions associated with the modified end-user executable code on the end-user device, causing the controller to:
  generate a data collection GUI using one or more information prompts according to the modified end-user executable code; and
  store data in the database structure according to the modified end-user executable code.

12. The method of claim 11, wherein the end-user executable code further includes a reporting GUI structure to be used when presenting the stored data and, in response to receiving a request to report the data in the database, the controller generates a reporting GUI using the code and the data.

13. The method of claim 12, wherein the reporting GUI structure to be used when presenting the stored data includes a graph.

14. The method of claim 12, wherein the reporting GUI structure to be used when presenting the stored data includes a chart.

15. The method of claim 11, wherein the end-user executable code further includes program instructions which generate an alert, the alert including a user response.

16. The method of claim 15, wherein the alert generated is an SMS message.

17. The method of claim 15, wherein the alert generated is an email.

18. The method of claim 11, wherein data in the database structure includes a user response received in response to the information prompt presented by the data collection GUI, and wherein at least one user response stored in the database is transmitted to another computerized system.

19. The method of claim 11, wherein the information prompt presented by the data collection GUI includes a JavaScript element.

20. The method of claim 11, wherein data in the database structure includes a user response received in response to the information prompt presented by the data collection GUI, and wherein at least one user response stored in the database is acquired from a barcode scanner.

* * * * *